United States Patent
Park

(10) Patent No.: US 11,271,229 B2
(45) Date of Patent: Mar. 8, 2022

(54) METHOD OF CONTROLLING MEASUREMENT OF CELL VOLTAGE OF FUEL CELL AND APPARATUS FOR EXECUTING THE SAME

(71) Applicant: HYUNDAI KEFICO CORPORATION, Gunpo-si (KR)

(72) Inventor: Hyun-Seok Park, Gunpo-si (KR)

(73) Assignee: HYUNDAI KEFICO CORPORATION, Gunpo-si (KR)

( * ) Notice: Subject to any disclaimer, the term of this patent is extended or adjusted under 35 U.S.C. 154(b) by 130 days.

(21) Appl. No.: 16/703,521

(22) Filed: Dec. 4, 2019

(65) Prior Publication Data

US 2020/0212465 A1 Jul. 2, 2020

(30) Foreign Application Priority Data

Dec. 28, 2018 (KR) .................. 10-2018-0172750

(51) Int. Cl.
*H01M 8/04537* (2016.01)

(52) U.S. Cl.
CPC ... *H01M 8/04567* (2013.01); *H01M 8/04552* (2013.01)

(58) Field of Classification Search
CPC ......... H01M 2250/20; H01M 8/04552; H01M 8/04567; Y02E 60/50; Y02T 90/40
See application file for complete search history.

(56) References Cited

U.S. PATENT DOCUMENTS

| | | | |
|---|---|---|---|
| 10,782,350 | B2 | 9/2020 | Huh et al. |
| 2018/0188326 | A1 | 7/2018 | Huh et al. |

FOREIGN PATENT DOCUMENTS

| | | |
|---|---|---|
| CN | 2829179 Y | 10/2006 |
| CN | 107850643 A | 3/2018 |
| JP | 2004180395 A | 6/2004 |
| JP | 3839397 B2 | 11/2006 |
| KR | 10-2011-0064055 A | 6/2011 |
| KR | 101735734 B1 | 5/2017 |

(Continued)

OTHER PUBLICATIONS

Machine Translation JP2004180395A (Year: 2004).*

(Continued)

*Primary Examiner* — Victoria H Lynch
(74) *Attorney, Agent, or Firm* — Lempia Summerfield Katz LLC

(57) ABSTRACT

An apparatus for measurement control of a cell voltage of a fuel cell includes: terminals connected between the cells of a fuel cell connected in series; first resistors connected in series to the terminals; capacitors each connected in parallel between the first resistors to store voltages; switches connected to the first resistors to switch into a closed or an open state; a second resistor connected in series between a lowest cell among the cells and a semiconductor GND to provide a path for a current flow when an inverse voltage occurs in the cells; a diode connected in parallel to the second resistor to provide a path for a current flow when an inverse voltage does not occur in the cells; and a controller to change the state of each switch depending on a cell voltage measurement or open-wire diagnosis mode and perform cell voltage measurement and open-wire diagnosis.

10 Claims, 7 Drawing Sheets

(56) References Cited

FOREIGN PATENT DOCUMENTS

| KR | 10-2018-0066337 A | 6/2018 |
| WO | 2011036867 A1 | 3/2011 |

OTHER PUBLICATIONS

Machine Translation KR20110064055A (Year: 2011).*
Korean Office Action dated Mar. 18, 2020 from the corresponding Korean Application No. 10-2018-0172750, 8 pp.
Office Action cited in Chinese patent application No. 201911235622.1; dated Dec. 2, 2021; 11pp.

* cited by examiner

METHOD OF CONTROLLING MEASUREMENT OF CELL VOLTAGE OF FUEL CELL AND APPARATUS FOR EXECUTING THE SAME

CROSS-REFERENCE TO RELATED APPLICATION

This application claims priority to and the benefit of Korean Patent Application No. 10-2018-0172750, filed on Dec. 28, 2018, the entire contents of which are incorporated herein by reference.

FIELD

The present disclosure relates to a method of controlling the measurement of a cell voltage of a fuel cell and an apparatus for executing the same.

BACKGROUND

The statements in this section merely provide background information related to the present disclosure and may not constitute prior art.

In general, a fuel cell is an energy conversion apparatus for directly converting chemical energy of fuel into electric energy by a chemical reaction.

Unlike a common battery, a fuel cell is a generation system capable of continuously generating electricity as long as fuel is supplied without a need for recharging.

As illustrated in FIG. 1, such a fuel cell includes an electrolyte and two electrodes, which are stacked like a sandwich. When oxygen ($O_2$) and hydrogen ($H_2$) flow into the respective electrodes, electricity is generated and heat and water are generated as by-products.

In a reaction for the generation of electricity of the fuel cell, after hydrogen ($H_2$) supplied to an anode, that is, an oxidation pole of the fuel cell, is separated into hydrogen ions and electrons, the hydrogen ions move to a cathode, that is, a reduction pole, through a polymer electrolyte film. The electrons move to the cathode through an external circuit. Oxygen molecules, the hydrogen ions and the electrons react to one another in the cathode and generate electricity and heat. At the same time, water is generated as a reaction by-product.

If a proper amount of water is present within the fuel cell, and when an electrochemical reaction occurs, water is generated and functions to maintain the humidification of a film-electrode bonding body.

However, if the water is not properly removed when an excess amount of water is generated, a "water overflow or flooding" phenomenon occurs in a high current density. The overflowed water functions to hinder reactant gases from being efficiently supplied into a cell of the fuel cell, thereby further increasing a voltage loss.

A supply starvation problem of all of hydrogen of the anode, oxygen of the cathode, that is, reactant gases used for PEMFC, or air may occur due to various causes, such as water overflow within a fuel cell, ice formation in the winter time, and the abnormality of a reaction gas supply apparatus.

However, it has been known that a cell voltage is greatly reduced because the hydrogen fuel starvation of the anode has a very fatal effect on cell performance of the fuel cell.

In general, the hydrogen supply starvation phenomenon may be basically divided into an "overall hydrogen starvation" phenomenon in which a hydrogen supply generally starves in a cell of a fuel cell and a "local hydrogen starvation" phenomenon in which an overall hydrogen supply to a cell is sufficient, but a hydrogen supply partially starves due to an uneven distribution.

Particularly, such a hydrogen starvation phenomenon frequently occurs in operation conditions, such as the uneven supply and distribution of hydrogen gas, a sudden increase in a fuel cell load demand, and fuel cell start-up.

Among them, the overall hydrogen starvation phenomenon may be relatively easily detected by monitoring a hydrogen supply state using a sensor in a fuel cell operating apparatus (e.g., balance of plant), but a local hydrogen starvation phenomenon in some cells may be detected by only closely monitoring each cell of a fuel cell through a cell voltage measurement semiconductor.

For example, a voltage of one cell may suddenly drop to 0.1 V while a fuel cell operates normally for 5 minutes or more. If such a sudden cell voltage drop phenomenon occurs, such an abnormal operation cell needs to be replaced and repaired after the operation of the fuel cell within a fuel cell vehicle is immediately stopped and the fuel cell is dismantled for the continuous operation of the vehicle.

Most of such phenomena occur due to local hydrogen supply starvation. If a cell whose voltage suddenly drops is left and a vehicle continues to operate, a cell inverse voltage state in which a voltage reaches a voltage less than 0 V is rapidly reached. Accordingly, the corrosion of carbon, that is, a catalyst support of MEA, may be accelerated.

As described above, when an inverse voltage is generated in a conventional fuel cell, a reverse current is applied to a cell voltage measurement semiconductor. We have discovered that there is a problem in that the cell voltage measurement semiconductor may be burnt due to a low tolerance for an inverse voltage.

Furthermore, we have found that false operation occurs during an open-wire diagnosis operation using the cell voltage measurement semiconductor.

SUMMARY

Various forms of the present disclosure are directed to a method of controlling the measurement of a cell voltage of a fuel cell to inhibit the burning of a fuel cell voltage measurement semiconductor attributable to an inverse voltage by limiting a reverse continuous current in such a manner that a reverse current is made to flow through a resistor having a higher resistance value than a separate cell voltage measurement circuit, not a resistor of a cell voltage measurement circuit, when the inverse voltage is generated while a battery cell operates in a cell voltage measurement mode.

Furthermore, the present disclosure provides a method of controlling the measurement of a cell voltage of a fuel cell, which can inhibit the occurrence of a voltage drop attributable to a current flowing through a resistor in such a manner that the current is made to flow through a diode when a battery cell is in a cell voltage measurement mode or an open-wire diagnosis mode, and an apparatus for executing the same.

Objects of the present disclosure are not limited to the above-described objects, and other objects and advantages of the present disclosure not described above may be understood from the following description and evidently understood based on forms of the present disclosure. It may also be seen that the objects and advantages of the present disclosure may be realized by means written in the claims and a combination thereof.

In one form of the present disclosure, an apparatus for controlling a measurement of a cell voltage of a fuel cell includes: a plurality of terminals connected between cells of a fuel cell which are connected in series; first resistors connected in series to the plurality of terminals, respectively; a plurality of capacitors each connected in parallel between the first resistors and configured to store voltages; a plurality of switches connected to the first resistors, respectively, and configured to switch into a closed state or an open state so that cell voltage measurement or open-wire diagnosis is performed; a second resistor connected in series between a negative (−) pole of a lowest cell among the cells of the fuel cell and a semiconductor ground (GND), where the second resistor is configured to provide a path along which a current flows when an inverse voltage is generated in the cells of the fuel cell; a diode connected in parallel to the second resistor and configured to provide a path along which a current flows when an inverse voltage is not generated in the cells of the fuel cell; and a controller configured to change the state of each switch of the plurality of switches in a cell voltage measurement mode or an open-wire diagnosis mode and to perform cell voltage measurement and an open-wire diagnosis.

In one form, the controller is configured to maintain the state of each switch of the plurality of switches to the open state in the cell voltage measurement mode and to maintain the state of each switch of the plurality of switches to the closed state in the open-wire diagnosis mode.

In another form, the diode provides a path along which a current flows when an inverse voltage is not generated in the fuel cell in the cell voltage measurement mode or the open-wire diagnosis mode.

In other form, the second resistor provides a path along which a reverse current flows when an inverse voltage is generated in a cell of the fuel cell in the cell voltage measurement mode.

In one aspect of the present disclosure, the controller may compare a voltage of a capacitor measured in the cell voltage measurement mode, with a voltage of the capacitor measured in the open-wire diagnosis mode and determine that an open-wire has occurred depending on whether a voltage difference is greater than a specific threshold.

In another form, a method of controlling a measurement of a cell voltage of a fuel cell includes: changing, by a controller, a state of each switch of a plurality of switches connected to first resistors of a fuel cell, respectively, in a cell voltage measurement mode or an open-wire diagnosis mode; determining, by the controller, whether an open-wire occurs based on a voltage difference between voltages measured in the cell voltage measurement mode and the open-wire diagnosis mode; and providing a path along which a reverse current flows through the first resistors when an inverse voltage is generated in the cell voltage measurement mode.

In another aspect, the changing of the state of each of the plurality of switches includes: changing the state of each switch of the plurality of switches into an open state in the cell voltage measurement mode, and changing the state of each switch of the plurality of switches into a closed state in the open-wire diagnosis mode.

In other form, the determining of whether an open-wire occurs based on the voltage difference includes: providing a path so that a current flows through the first resistors connected to the plurality of switches, respectively, and a diode connected in parallel to a second resistor in the cell voltage measurement mode or the open-wire diagnosis mode.

Furthermore, the providing of the path along which the reverse current flows through the first resistors includes: providing the path along which the reverse current flows through the second resistor when the inverse voltage is generated in the cell voltage measurement mode.

In other form, the determining of whether an open-wire occurs based on the voltage difference includes: comparing a voltage of a capacitor connected to a first resistor among the first resistors in the cell voltage measurement mode, with a voltage of the capacitor in the open-wire diagnosis mode; and determining whether an open-wire has occurred based on whether a compared voltage difference is greater than a specific threshold.

Furthermore, the method further includes determining that the open-wire has occurred when a difference between voltages of capacitors of adjacent cells in the cell voltage measurement mode is greater than a specific threshold.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
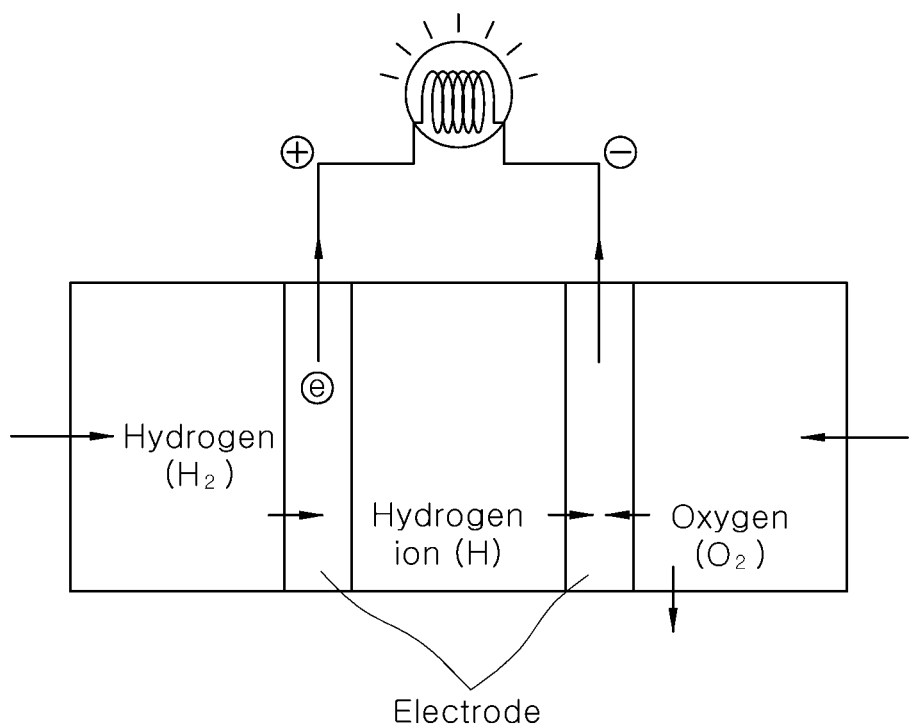
FIG. 1 is a diagram illustrating the principle of a fuel cell.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a method of controlling the measurement of a cell voltage of a fuel cell and an apparatus for executing the same will be described with reference to the accompanying drawings through various exemplary forms.

The above-described objects, characteristics, and merits are described in detail with reference to the accompanying drawings, and thus a person having ordinary skill in the art to which the present disclosure pertains may readily practice the technical spirit of the present disclosure. Furthermore, in describing the present disclosure, a detailed description of a known art related to the present disclosure will be omitted if it is deemed to unnecessarily obscure the gist of the present disclosure. Hereinafter, forms according to the present disclosure are described in detail with reference to the accompanying drawings. In the drawings, the same reference numerals are used to denote the same or similar elements.

Figure 2:
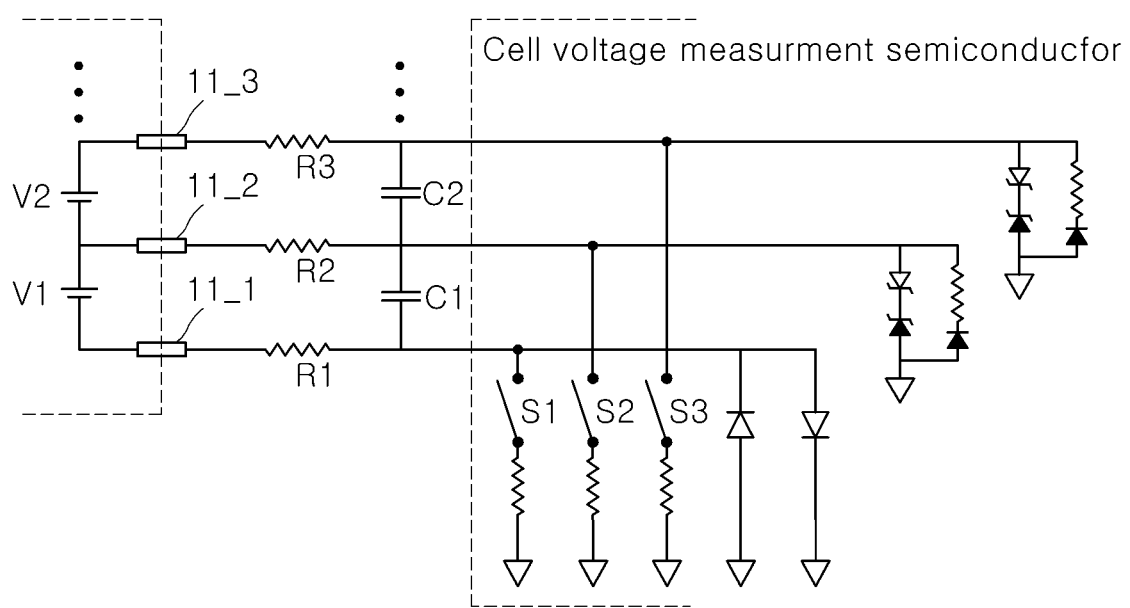
FIG. 2 is a circuit diagram for describing an internal configuration of a known apparatus for controlling the measurement of a cell voltage of a fuel cell.

FIG. 2 is a circuit diagram for describing an internal configuration of a known apparatus 10 for controlling the measurement of a cell voltage of a fuel cell.

Referring to FIG. 2, the apparatus 10 for controlling the measurement of a cell voltage of a fuel cell includes a plurality of terminals 11_1, 11_2, and 11_3 between which each of the cells of a fuel cell that is connected in series, a plurality of resistors R1 to Rn connected in series to the plurality of terminals 11_1, 11_2, and 11_3, respectively, a plurality of capacitors C1 to Cn connected between the plurality of resistors R1 to Rn and configured to store voltages, and a plurality of switches S1 to Sn connected to the plurality of resistors R1 to Rn, respectively.

The plurality of terminals 11_1, 11_2, and 11_3 is connected to the cells of each fuel cell and is connected in series to the first resistors R1 to Rn, respectively. For example, the plurality of terminals 11_1 to 11_n may be implemented as a positive (+) stage and a negative (−) stage.

The plurality of resistors R1 to Rn is connected in series to the plurality of terminals 11_1, 11_2, and 11_3, respectively, and provides paths along which currents applied from the respective terminals 11_1, 11_2, and 11_3 flow. The currents passing through the plurality of resistors R1 to Rn are applied to a cell voltage measurement semiconductor.

However, when an inverse voltage (e.g., −1 V based on each cell) is generated in the fuel cell, a reverse current is applied to the cell voltage measurement semiconductor through the plurality of resistors R1 to Rn. In such a case, there is a problem in that the cell voltage measurement semiconductor may be burnt due to a low tolerance for the inverse voltage.

The plurality of capacitors C1 to Cn is connected in parallel between the plurality of resistors R1 to Rn. For example, the first capacitor C1 may be connected between any two (e.g., R1 and R2) of the plurality of resistors. The second capacitor C2 may be connected between any two (e.g., R2 and R3) of the plurality of resistors. In this case, the first capacitor C1 and the second capacitor C2 may be connected in series.

Each of the plurality of switches S1 to Sn maintains a closed state or an open state so that cell voltage measurement or open-wire diagnosis is performed by the fuel cell voltage measurement semiconductor.

In one form, each of the plurality of switches S1 to Sn maintains an open state so that cell voltage measurement is performed by the fuel cell voltage measurement semiconductor.

As described above, if each of the plurality of switches S1 to Sn maintains an open state and cell voltage measurement is performed by the fuel cell voltage measurement semiconductor, currents applied from the plurality of terminals 11_1, 11_2, and 11_3 are applied to the cell voltage measurement semiconductor through each of the plurality of resistors R1 to Rn.

However, when an inverse voltage (e.g., −1 V based on each cell) is generated in the fuel cell, a reverse current is applied to the cell voltage measurement semiconductor through the plurality of resistors R1 to Rn. In such a case, there is a problem in that the cell voltage measurement semiconductor may be burnt due to a low tolerance for the inverse voltage.

Furthermore, if each of the plurality of switches S1 to Sn maintains a closed state and open-wire diagnosis is performed by the fuel cell voltage measurement semiconductor, a high current flows because a current for the open-wire diagnosis of all channels flows. A great voltage drop occurs in a second resistor because the high current flows through the second resistor. Accordingly, there is a need for a method for preventing a wrong diagnosis because a normal circuit is erroneously diagnosed as an open-wire.

Figure 3:
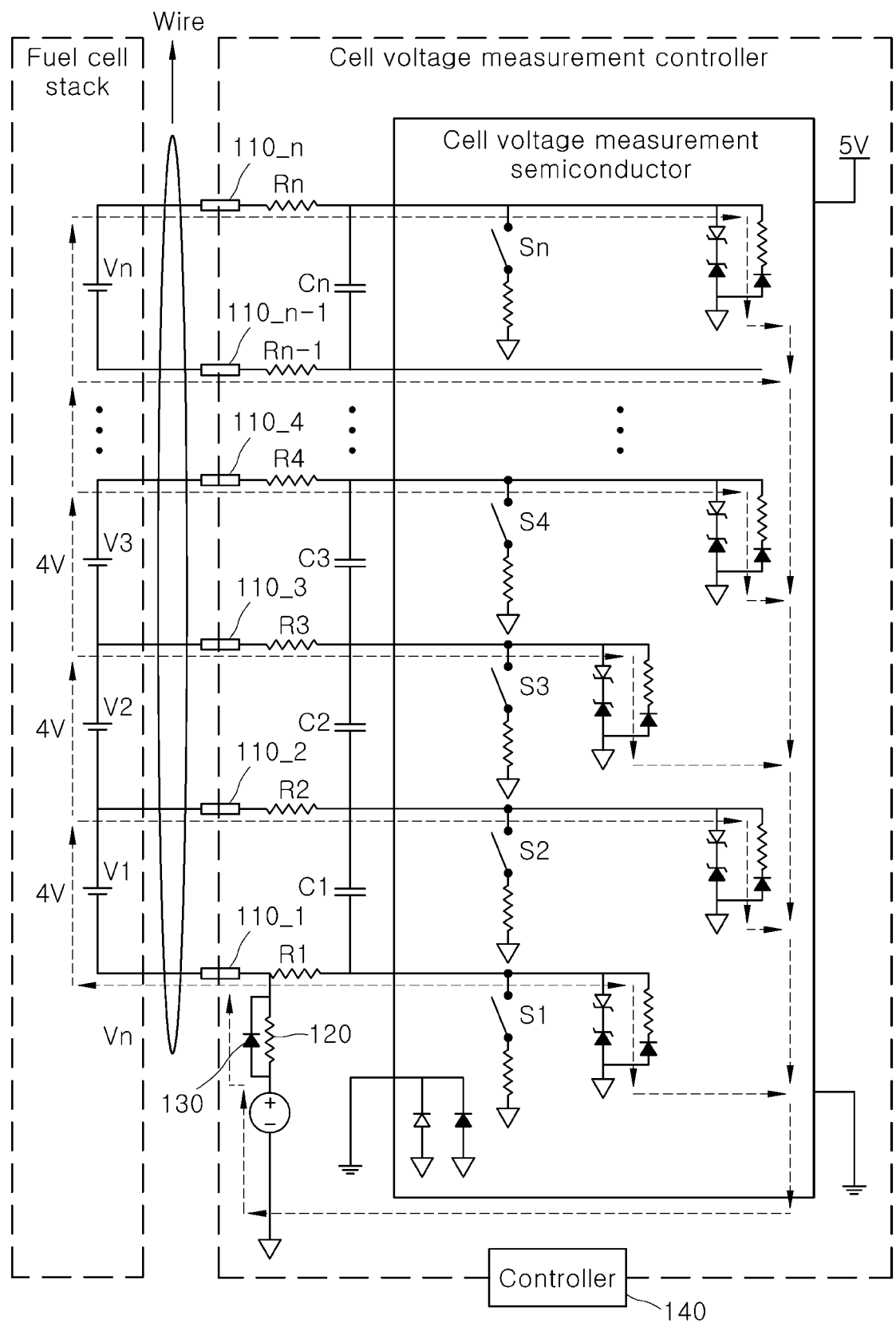
FIG. 3 is a circuit diagram for describing an internal configuration of an apparatus for controlling the measurement of a cell voltage of a fuel cell.
Figure 4:
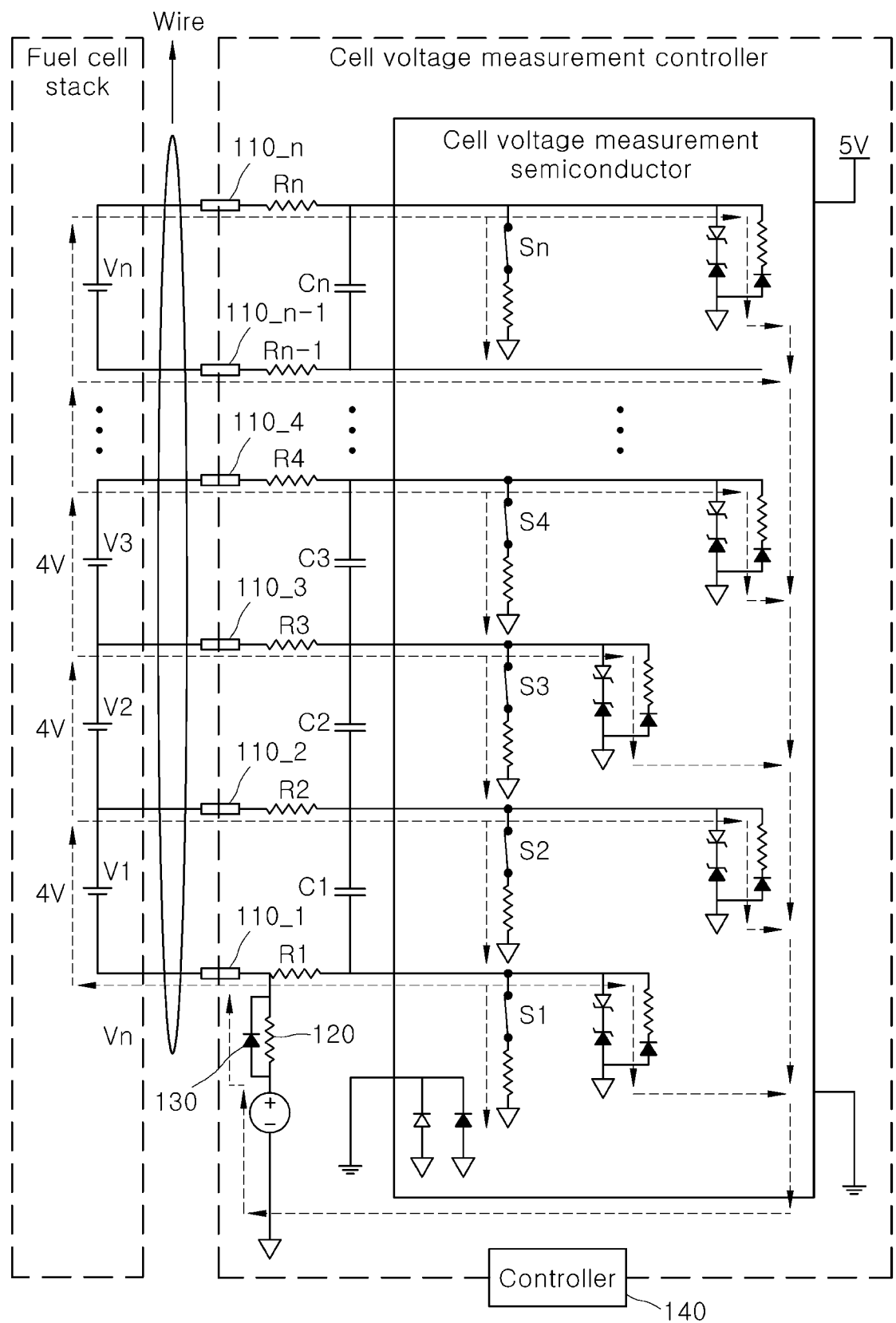
FIG. 4 is a circuit diagram for describing an internal configuration of an apparatus for controlling the measurement of a cell voltage of a fuel cell.

FIGS. 3 and 4 are circuit diagrams for describing an internal configuration of an apparatus 100 for controlling the measurement of a cell voltage of a fuel cell according to one form of the present disclosure.

Referring to FIGS. 3 and 4, the apparatus 100 for controlling the measurement of a cell voltage of a fuel cell includes a plurality of terminals 110_1 to 110_n between which each of the cells of a fuel cell that is connected in series, first resistors R1 to Rn connected to the plurality of terminals 110_1 to 110_n, respectively, a plurality of capacitors C1 to Cn connected in parallel between the first resistors R1 to Rn and configured to store voltages, a second resistor 120 connected in series between the negative (−) pole of the lowest cell V1 of the cells of the fuel cell and a semiconductor GND and configured to provide a path along which a current flows when an inverse voltage is generated in a cell of the fuel cell, a diode 130 connected in parallel to the second resistor 120, a plurality of switches S1 to Sn connected to the first resistors R1 to Rn, respectively, and a controller 140 configured to control the plurality of switches S1 to Sn and perform cell voltage measurement and an open-wire diagnosis.

The plurality of terminals 110_1 to 110_n is connected to the cells of the fuel cell, and is connected in series to the first resistors R1 to Rn, respectively. For example, the plurality of terminals may be implemented as a positive (+) stage and a negative (−) stage.

The first resistors R1 to Rn are connected in series to the plurality of terminals 110_1 to 110_n, respectively, and provide paths along which currents applied from the respective terminals 110_1 to 110_n flow. Currents passing through the first resistors R1 to Rn are applied to a cell voltage measurement semiconductor.

The plurality of capacitors C1 to Cn is connected in parallel between the first resistors R1 to Rn.

The diode 130 is connected in parallel to the second resistor 120. If an inverse voltage is not generated in the fuel cell, the diode provides a path along which a current flows in a cell voltage measurement mode or an open-wire diagnosis mode.

If each of the plurality of switches S1 to Sn maintains an open state as in FIG. 3, the fuel cell operates in the cell voltage measurement mode. If the fuel cell operates in the cell voltage measurement mode as in FIG. 3, a current does not flow through the plurality of switches S1 to Sn and the first resistors connected to the respective switches S1 to Sn because each of the plurality of switches S1 to Sn maintains an open state.

Accordingly, a current measured in the cell voltage measurement mode is lower than a current measured in the open-wire diagnosis mode. Accordingly, the current does not flow through the second resistor 120 and flows through the diode 130.

If each of the plurality of switches S1 to Sn maintains a closed state as in FIG. 4, the fuel cell operates in an open-wire diagnosis mode. If the fuel cell operates in the open-wire diagnosis mode as in FIG. 4, a current flows through the plurality of switches S1 to Sn and the first resistors connected to the respective switches S1 to Sn because each of the plurality of switches S1 to Sn maintains the closed state.

Accordingly, a current flowing in the open-wire diagnosis mode is higher than a current flowing in the cell voltage measurement mode. When the current flows through the second resistor 120, a voltage drop through the second resistor becomes great. Accordingly, the diode 130 is connected in parallel to the second resistor 120 so that the current flows through the diode 130.

Each of the plurality of switches S1 to Sn maintains an open state in the cell voltage measurement mode and a closed state in the open-wire diagnosis mode under the control of the controller 140.

The controller 140 changes the state of each of the plurality of switches depending on the cell voltage measurement mode or the open-wire diagnosis mode, and performs cell voltage measurement and an open-wire diagnosis.

To this end, in the cell voltage measurement mode, the controller 140 maintains the state of each of the plurality of switches S1 to Sn to an open state and then measures a cell voltage. In the open-wire diagnosis mode, the controller 140 maintains the state of each of the plurality of switches S1 to Sn to a closed state and then measures a cell voltage in the state in which a diagnosis current is made to flow.

Hereinafter, a process of operating, by the controller 140, in the open-wire diagnosis mode by maintaining the state of each of the plurality of switches S1 to Sn to a closed state is described.

The controller 140 compares a voltage of a capacitor, measured in the cell voltage measurement mode, with a voltage of the capacitor measured in the open-wire diagnosis mode, and determines that an open-wire has occurred depending on whether a voltage difference is a specific threshold or more.

In one form, the controller 140 compares a voltage of a capacitor, measured in the cell voltage measurement mode, with a voltage of the capacitor measured in the open-wire diagnosis mode, and determines that an open-wire has occurred if a voltage difference is greater than a specific threshold.

In another form, the controller 140 compares a voltage of a capacitor, measured in the cell voltage measurement mode, with a voltage of the capacitor measured in the open-wire diagnosis mode, and determines that an open-wire has not occurred if a voltage difference is a specific threshold or less.

In the above form, the controller 140 determines that an open-wire has occurred if a difference between voltages of capacitors of adjacent cells measured in the cell voltage measurement mode is a specific threshold or more.

Figure 5:
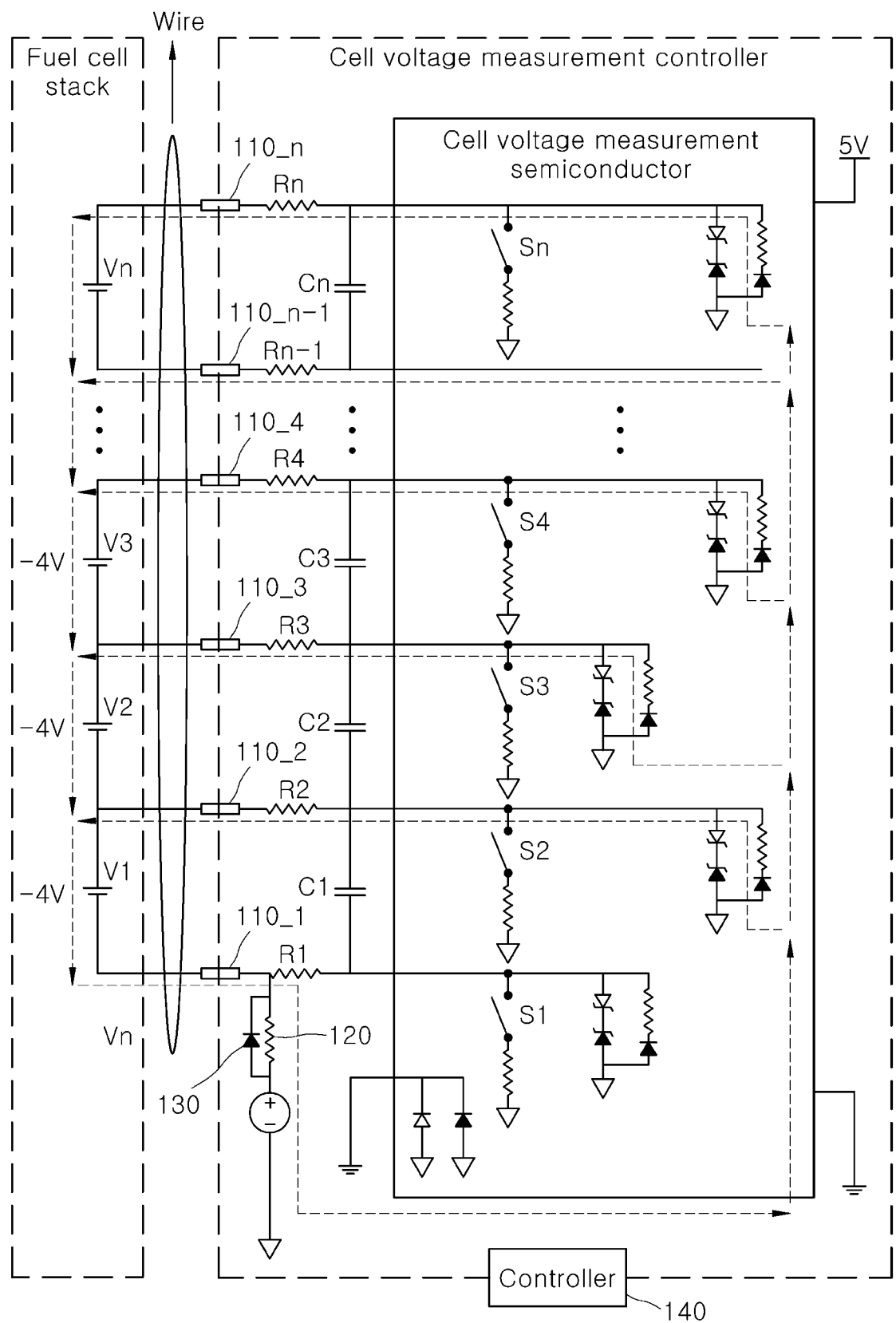
FIG. 5 is a circuit diagram for describing an internal configuration of an apparatus for controlling the measurement of a cell voltage of a fuel cell.

FIG. 5 is a circuit diagram for describing an internal configuration of an apparatus 100 for controlling the measurement of a cell voltage of a fuel cell according to another form of the present disclosure.

Referring to FIG. 5, the apparatus 100 for controlling the measurement of a cell voltage of a fuel cell includes a plurality of terminals 110_1 to 110_n between which each of the cells of a fuel cell that is connected in series, first resistors R1 to Rn connected to the plurality of terminals 110_1 to 110_n, respectively, a plurality of capacitors C1 to Cn connected in parallel between the first resistors R1 to Rn and configured to store voltages, a second resistor 120 connected in series between the negative (−) pole of the lowest cell V1 of the cells of the fuel cell and a semiconductor ground (GND) and configured to provide a path along which a current flows when an inverse voltage is generated in a cell of the fuel cell, a diode 130 connected in parallel to the second resistor 120 and configured to provide a path along which a current flows when an inverse voltage is not generated in a cell of the fuel cell, a plurality of switches S1 to Sn connected to the first resistors R1 to Rn, respectively, and a controller 140 configured to control the plurality of switches S1 to Sn and perform cell voltage measurement and an open-wire diagnosis.

The plurality of terminals 110_1 to 110_n is connected to the cells of the fuel cell, and is connected in series to the first resistors R1 to Rn, respectively. For example, the plurality of terminals may be implemented as a (+) stage and a (−) stage.

The first resistors R1 to Rn are connected in series to the plurality of terminals 110_1 to 110_n, respectively, and provide paths along which currents applied from the respective terminals 110_1 to 110_n flow. Currents passing through the first resistors R1 to Rn are applied to a cell voltage measurement semiconductor.

However, when an inverse voltage (e.g., −1 V based on each cell) is generated in a cell of the fuel cell, a reverse current is applied to the cell voltage measurement semiconductor through the plurality of resistors R1 to Rn. In such a case, there is a problem in that the cell voltage measurement semiconductor may be burnt due to a low tolerance for the inverse voltage.

As described above, the present disclosure can prevent the burning of the cell voltage measurement semiconductor attributable to an inverse voltage by limiting a reverse current in such a manner that when the inverse voltage is generated in a cell of the fuel cell, the reverse current does not directly flow into the GND of the cell voltage measurement semiconductor via the first resistors R1 to Rn, but is made to flow into the GND of the cell voltage measurement semiconductor via the second resistor 120. Such a process is described more specifically below with reference to the second resistor 120.

The plurality of capacitors C1 to Cn is connected in parallel between the first resistors R1 to Rn. For example, the first capacitor C1 may be connected between any two (e.g., R1 and R2) of the first resistors R1 to Rn, and the second capacitor C2 may be connected between any two (e.g., R2 and R3) of the first resistors R1 to Rn. In this case, the first capacitor C1 and the second capacitor C2 may be connected in series.

The second resistor 120 is connected in series between the (−) pole of the lowest cell V1 of the cells of the fuel cell and the semiconductor GND, and provides a path along which a current flows depending on whether an inverse voltage is generated in the fuel cell.

If the state of each of the plurality of switches S1 to Sn maintains an open state and the fuel cell operates in a cell voltage measurement mode, the second resistor 120 provides a path along which a current flows when an inverse voltage is generated in a cell of the fuel cell.

In such a case, currents flowing through the first resistors R1 to Rn do not directly flow into the GND of the cell voltage measurement semiconductor, but flow through the second resistor 120. Accordingly, the burning of the cell voltage measurement semiconductor attributable to the inverse voltage can be prevented by limiting the reverse current.

The diode 130 is connected in parallel to the second resistor 120. If an inverse voltage is not generated in the fuel cell, the diode 130 provides a path along which a current flows in a cell voltage measurement mode or an open-wire diagnosis mode.

In a conventional technology, the second resistor 120 is not provided as illustrated in FIG. 2. Accordingly, when an inverse voltage is generated in a cell of the fuel cell, a reverse current directly flows into the cell voltage measurement semiconductor through the resistor R1 of the first resistors R1 to R3. In such a case, there is a problem in that the cell voltage measurement semiconductor may be burnt due to a low tolerance for the inverse voltage.

In order to prevent the problem, the present disclosure provides a path along which a reverse current flows through the second resistor 120, not the resistor R1, when an inverse voltage is generated in the fuel cell, depending on an operation of the controller 140 by adding the second resistor 120 in series instead of a flow of a current flowing into the resistor R1 of the first resistors R1 to R3.

Accordingly, the present disclosure can inhibit or prevent the burning of the fuel cell voltage measurement semiconductor attributable to an inverse voltage by limiting a reverse current in such a manner that the reverse current flows through the second resistor 120 when the inverse voltage is generated.

Each of the plurality of switches S1 to Sn maintains an open state in a cell voltage measurement mode and a closed state in an open-wire diagnosis mode under the control of the controller 140. If an inverse voltage is generated when the controller 140 operates in the cell voltage measurement mode or the open-wire diagnosis mode, the controller 140 controls a current to flow through the second resistor 120. If an inverse voltage is not generated, the controller 140 controls a current to flow through the diode 130.

To this end, the controller 140 maintains the state of each of the plurality of switches S1 to Sn to an open state in the cell voltage measurement mode, and maintains the state of each of the plurality of switches S1 to Sn to a closed state in the open-wire diagnosis mode.

Hereinafter, a process of operating, by the controller 140, in a cell voltage measurement mode by maintaining the state of each of the plurality of switches S1 to Sn to an open state is described.

The controller 140 measures a cell voltage in the state in which the state of each of the plurality of switches S1 to Sn has been maintained to the open state in the cell voltage measurement mode. At this time, the controller 140 provides a path so that a current flows through the second resistor 120 depending on whether an inverse voltage has been generated in the process of measuring the cell voltage in the cell voltage measurement mode.

In the above form, the controller 140 provides a path along which a reverse current flows through the second resistor 120 when an inverse voltage is generated in a cell of the fuel cell. As described above, the present disclosure controls the reverse current to flow through the second resistor 120 when the inverse voltage is generated, and thus can prevent the burning of the fuel cell voltage measurement semiconductor attributable to the inverse voltage by limiting the reverse current.

Figure 6:
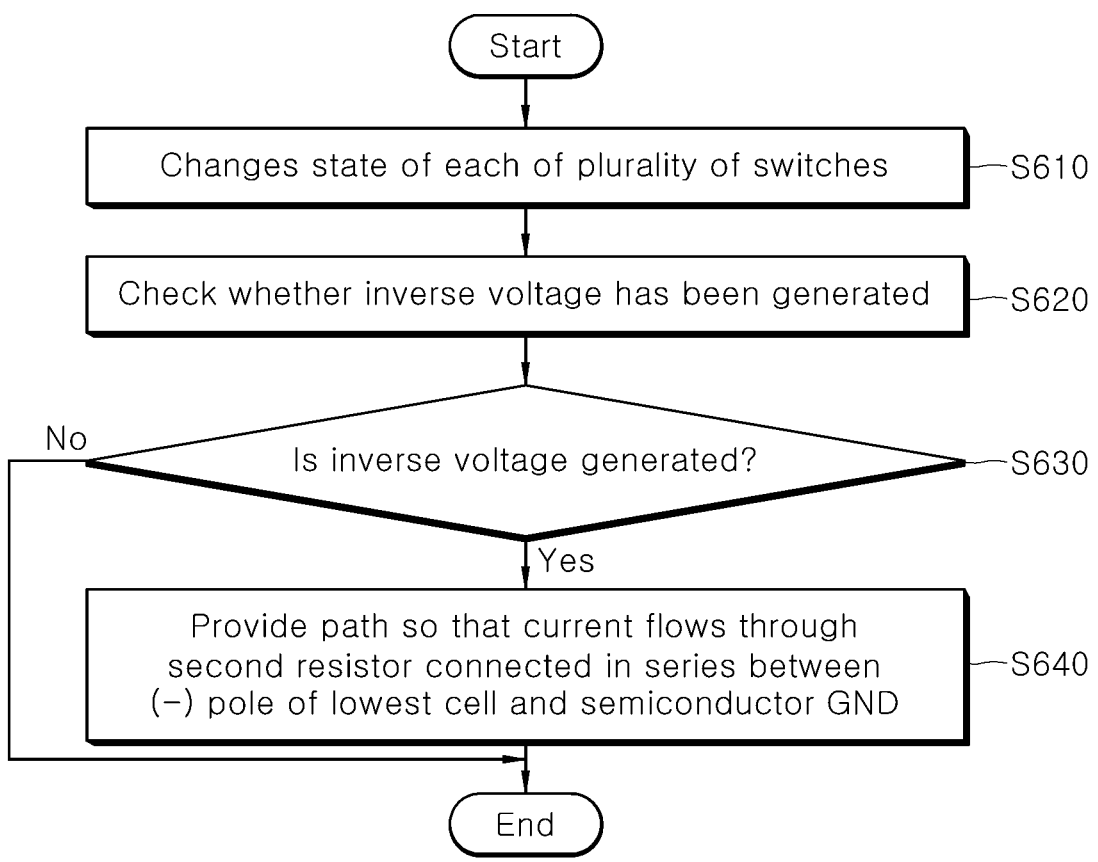
FIG. 6 is a flowchart for describing a method of controlling the measurement of a cell voltage of a fuel cell.

FIG. 6 is a flowchart for describing a method of controlling the measurement of a cell voltage of a fuel cell according to one form of the present disclosure.

Referring to FIG. 6, the apparatus 100 for controlling the measurement of a cell voltage of a fuel cell changes the state of each of the plurality of switches depending on a cell voltage measurement mode or an open-wire diagnosis mode (step S610).

In one form of step S610, the apparatus 100 for controlling the measurement of a cell voltage of a fuel cell changes the state of each of the plurality of switches into an open state when operating in the cell voltage measurement mode.

In another form of step S610, the apparatus 100 for controlling the measurement of a cell voltage of a fuel cell changes the state of each of the plurality of switches into a closed state when operating in the open-wire diagnosis mode.

The apparatus 100 for controlling the measurement of a cell voltage of a fuel cell checks whether an inverse voltage has been generated in the fuel cell when the apparatus operates in the cell voltage measurement mode (step S620).

If an inverse voltage is generated (step S630), the apparatus 100 for controlling the measurement of a cell voltage of a fuel cell provides a path along which a current flows through the second resistor connected in series between the (−) pole of the lowest cell of the cells of the fuel cell and the semiconductor GND (step S640).

As described above, the present disclosure has an advantage in that it can prevent the burning of a fuel cell voltage measurement semiconductor attributable to an inverse voltage by limiting a reverse current in such a manner that the reverse current flows through the second resistor when the inverse voltage is generated.

Figure 7:
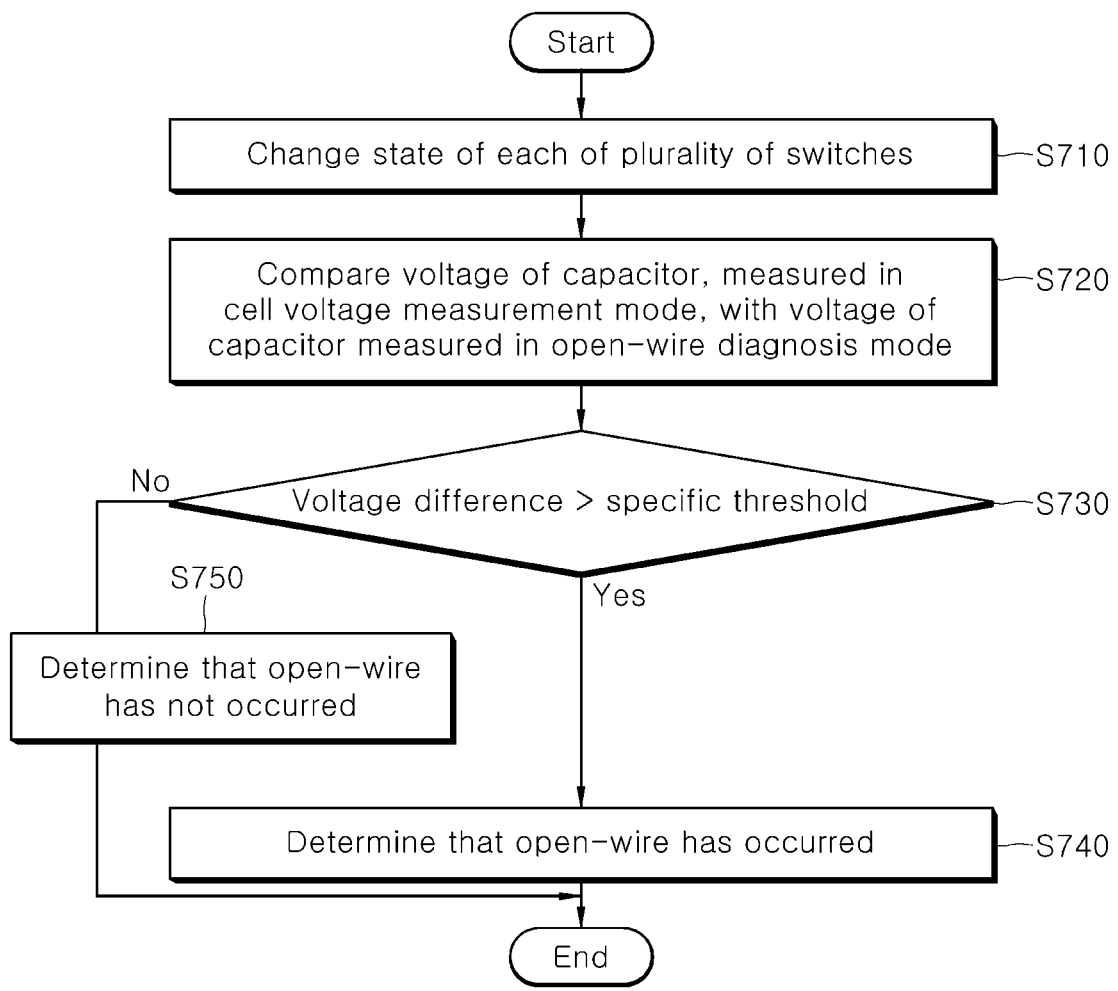
FIG. 7 is a flowchart for describing another form of a method of controlling the measurement of a cell voltage of a fuel cell.

FIG. 7 is a flowchart for describing a method of controlling the measurement of a cell voltage of a fuel cell according to another form of the present disclosure.

Referring to FIG. 7, the apparatus 100 for controlling the measurement of a cell voltage of a fuel cell changes the state of each of the plurality of switches depending on a cell voltage measurement mode or an open-wire diagnosis mode (step S710).

In one form, in step S710, the apparatus 100 for controlling the measurement of a cell voltage of a fuel cell changes the state of each of the plurality of switches to an open state when operating in the cell voltage measurement mode.

In another form, in step S710, the apparatus 100 for controlling the measurement of a cell voltage of a fuel cell changes the state of each of the plurality of switches to a closed state when operating in the open-wire diagnosis mode.

The apparatus 100 for controlling the measurement of a cell voltage of a fuel cell compares a voltage of a capacitor, measured in the cell voltage measurement mode, with a voltage of the capacitor measured in the open-wire diagnosis mode (step S720).

If a voltage difference is greater than a specific threshold (step S730), the apparatus 100 for controlling the measurement of a cell voltage of a fuel cell determines that an open-wire has occurred (step S740).

If the voltage difference is the specific threshold or less (step S730), the apparatus 100 for controlling the measurement of a cell voltage of a fuel cell determines that an open-wire has not occurred (step S750).

Alternatively, the apparatus 100 compares voltages of capacitors of adjacent cells in the cell voltage measurement mode. If a voltage difference is greater than a specific threshold, the apparatus 100 determines that an open-wire has occurred.

According to the present disclosure described above, if an inverse voltage is generated when a battery cell operates in a cell voltage measurement mode, a reverse current flows through a resistor having a higher resistance value than a separate cell voltage measurement circuit, not a resistor of a cell voltage measurement circuit. Accordingly, there is an advantage in that the burning of a fuel cell voltage measurement semiconductor attributable to an inverse voltage can be prevented by limiting a reverse continuous current.

Furthermore, according to the present disclosure, there is an advantage in that a voltage drop in a resistor can be inhibited or prevented because a current flows through a diode, not the resistor, when a battery cell operates in a cell voltage measurement mode or an open-wire diagnosis mode.

Although exemplary forms of the disclosure have been disclosed for illustrative purposes, those skilled in the art will appreciate that various modifications, additions and substitutions are possible, without departing from the scope and spirit of the disclosure.

What is claimed is:

1. An apparatus for controlling a measurement of a cell voltage of a fuel cell, the apparatus comprising:
    a plurality of terminals connected between cells of a fuel cell which are connected in series;
    first resistors connected in series to the plurality of terminals, respectively;
    a plurality of capacitors each connected in parallel between the first resistors and configured to store voltages;
    a plurality of switches connected to the first resistors, respectively, and configured to switch into a closed state or an open state;
    a second resistor connected in series between a negative pole of a lowest cell among the cells of the fuel cell and a semiconductor ground (GND), where the second resistor is configured to provide a path along which a current flows based on whether an inverse voltage is generated in the cells of the fuel cell;
    a diode connected in parallel to the second resistor and configured to provide a path along which the current flows when the inverse voltage is not generated in the cells of the fuel cell; and
    a controller configured to:
    change a state of each switch of the plurality of switches in a cell voltage measurement mode or an open-wire diagnosis mode, and
    perform cell voltage measurement and an open-wire diagnosis.

2. The apparatus of claim 1, wherein the controller is configured to:
    maintain the state of each switch of the plurality of switches to the open state in the cell voltage measurement mode, and
    maintain the state of each switch of the plurality of switches to the closed state in the open-wire diagnosis mode.

3. The apparatus of claim 1, wherein the diode is configured to provide the path along which the current flows when the controller operates in the cell voltage measurement mode or the open-wire diagnosis mode.

4. The apparatus of claim 1, wherein the second resistor is configured to provide the path along which a reverse current flows when the controller operates in the cell voltage measurement mode and the inverse voltage is generated in a cell among the cells of the fuel cell.

5. The apparatus of claim 1, wherein the controller is configured to:
    compare a voltage of a capacitor measured in the cell voltage measurement mode, with a voltage of the capacitor measured in the open-wire diagnosis mode, and
    determine that an open-wire has occurred based on whether a voltage difference is greater than a specific threshold.

6. A method of controlling a measurement of a cell voltage of a fuel cell, the method comprising:
    changing, by a controller, a state of each switch of a plurality of switches connected to first resistors of a fuel cell, respectively, in a cell voltage measurement mode or an open-wire diagnosis mode;
    determining, by the controller, whether an open-wire occurs based on a voltage difference between voltages measured in the cell voltage measurement mode and the open-wire diagnosis mode; and
    providing a path along which a reverse current flows through the first resistors when an inverse voltage is generated in the cell voltage measurement mode,
    wherein changing the state of each switch of the plurality of switches comprises:
        changing the state of each switch of the plurality of switches into an open state in the cell voltage measurement mode; and
        changing the state of each switch of the plurality of switches into a closed state in the open-wire diagnosis mode.

7. The method of claim 6, wherein determining whether an open-wire occurs based on the voltage difference comprises:
    providing a path so that a current flows through the first resistors connected to the plurality of switches, respectively, and a diode connected in parallel to a second resistor in the cell voltage measurement mode or the open-wire diagnosis mode.

8. The method of claim 7, wherein providing the path along which the reverse current flows through the first resistors comprises:
    providing the path along which the reverse current flows through the second resistor when the inverse voltage is generated in the cell voltage measurement mode.

9. The method of claim 7, wherein determining whether an open-wire occurs based on the voltage difference comprises:
    comparing a voltage of a capacitor connected to a first resistor among the first resistors in the cell voltage measurement mode, with a voltage of the capacitor in the open-wire diagnosis mode, and
    determining whether an open-wire has occurred based on whether a compared voltage difference is greater than a specific threshold.

10. The method of claim 6, further comprising:
    determining that the open-wire has occurred when a difference between voltages of capacitors of adjacent cells in the cell voltage measurement mode is greater than a specific threshold.

* * * * *